Feb. 23, 1960
A. GOETZ
2,926,104
METHOD OF MAKING MICROPOROUS FILTER FILM
Filed June 27, 1955
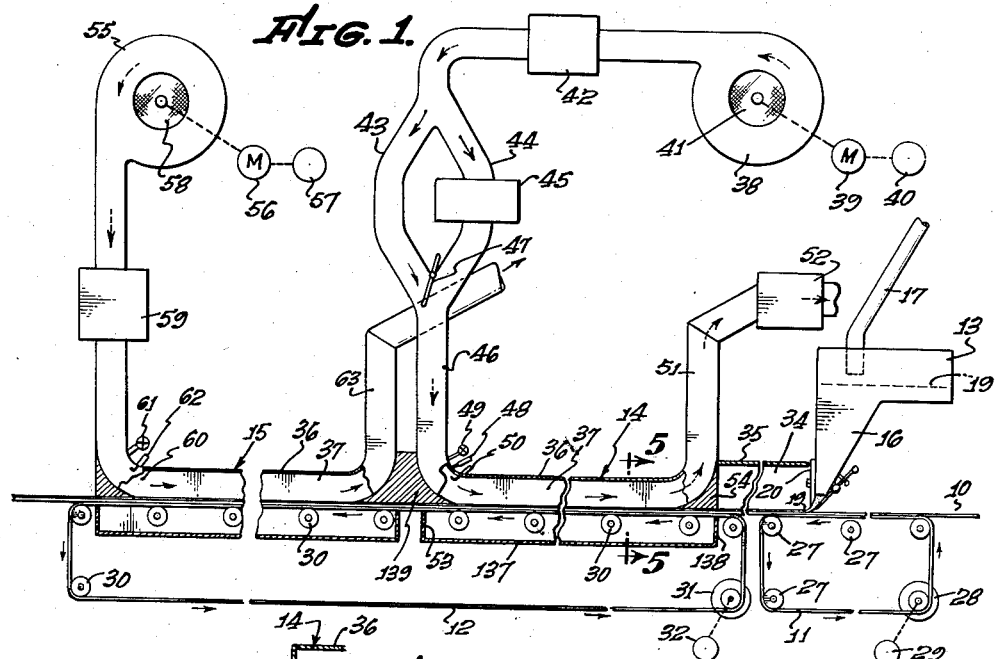
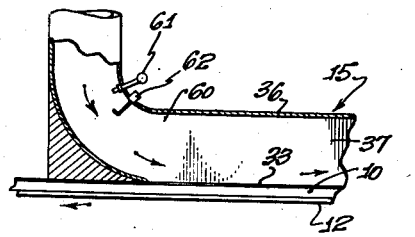
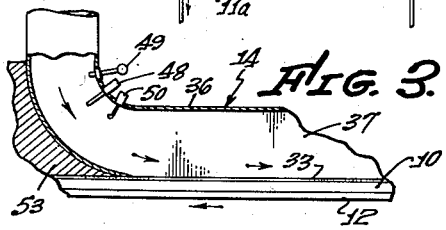
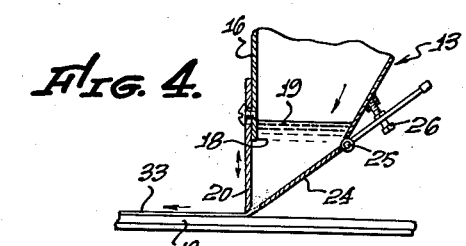
ALEXANDER GOETZ,
INVENTOR.
BY Lyon & Lyon
ATTORNEY.

United States Patent Office 2,926,104
Patented Feb. 23, 1960

2,926,104

METHOD OF MAKING MICROPOROUS FILTER FILM

Alexander Goetz, Altadena, Calif.

Application June 27, 1955, Serial No. 518,137

5 Claims. (Cl. 117—65)

This invention relates to the formation of improved membranes or films formed of cellulose esters and having extremely small pores, these films being usable for any of various known purposes, as for instance for filtering out bacteria or very minute particles from a fluid stream.

It is known in the art that microporous films can be formed from various types of cellulose esters, preferably cellulose nitrate or cellulose acetate, or a mixture thereof. Such films are produced by a process including the steps of first dissolving the ester or esters in a solvent, or a mixture of solvents and diluents, then spreading the resultant solution in a thin layer on a glass or metal surface, evaporating the solvents and diluents from this layer, and contacting the film with moisture to precipitate the film to a coherent form.

While the detailed reactions taking place during the conversion of the clear cellulose ester dilutions into a rigid paper-like film are not known, it is evident that this conversion takes place in at least two stages: the first, during which the solute is precipitated due to the gradual replacement of the solvent by a polar non-solvent (water), and converted in a gel representing a semi-solid coherent film of opaque appearance which consists of submicroscopic spherical bubbles of the solute, similar to a foam. During the second state, the liquid constituents of the gel are evaporated, and it is during this process that the pores are established by a partial coalescence of the foam lamella, which produce a rigid sponge-like structure of mutually communicating voids, which in turn establish 70–85 percent of the volume of the resulting membrane.

It is evident from this that the average effective pore size or diameter (though not referring to an easily definable geometrical shape, like the diameter of a cylindrical capillary) determines the performance of the membrane during filtration of gases and liquids. Furthermore the uniformity of this pore size over the whole surface of even large or endless sheets is of utmost importance. This pore size can be controlled in part by the choice of the solvent-diluent structure of the initial solution, mainly however by the control of the rate at which the exchange between the solvent and water vapor takes place during the gelation period. This rate depends, for any given solution composition, on the temperature, the partial pressure of water vapor, and solvents of the air contacting the surface of the layer, the thickness of the latter and also the variation of these factors during the gradual formation of the gel. While the sensitivity of the reaction leading to a microporous film offers an excellent means for controlling the pore size and thus the performance characteristics of this film, a slight fluctuation of these conditions causes immediately local irregularities in the gel structure and results in an inferior membrane— inferior because of the lack of uniformity. To avoid such deviations, it is of utmost importance not only that initially a physically and chemically uniform layer is cast, but also that henceforth the gelation history of each volume element of this layer is identical with that of every other.

Originally, the contacting of the film with moisture was effected by in some way contacting the entire surface of the film with a body of water in liquid form, as by completely immersing the film in water, or pouring the solution onto the surface of a body of water. However, it was later learned that the film conversion could be effected more easily by merely evaporating the solvent into a moist atmosphere, so that moisture could be absorbed into the film from the atmosphere at the same time that the solvent was being taken from the film. The present invention is concerned with improvements in a system of this latter type, i.e. an arrangement utilizing a moist atmosphere as the source of water.

The present invention is directed particularly to an improved system for producing films of the discussed type, in a manner such that maximum uniformity of manufacturing conditions may be maintained so that the films produced are of uniform and accurately predeterminable pore size. Also, the production methods and apparatus of the invention are adapted for a continuous type of manufacturing operation, to allow the commercial production of the films at a much lower cost than has been possible heretofore.

According to the unique process of the invention, the film forming solution is first applied to a carrier, and is then contacted by a moist atmosphere which flows past the film in a gelation zone within which the temperature, humidity, and rate of flow are very accurately controlled. These conditions are controlled in a manner such that all portions of the films have substantially identical temperature, humidity and air flow histories during the gelation process; i.e., at any particular stage during gelation of a certain portion of the film, that portion is subjected to air of exactly the same temperature, humidity and rate of flow as that to which the other portions of the film are subjected at the same stage in their formation. This is true even though the conditions may actually vary along the length of the gelation zone, due to changes in the quantities of solvent and moisture in the air stream resulting from absorption of solvent into the air and moisture into the film.

This uniform gelation history may be maintained by relatively moving the film and the air directing means in a manner such that the film relatively advances through the gelation zone, from a film inlet end of the zone to a film outlet end. Preferably, this relative advancement is effected by moving the film while the means defining the air path and gelation zone remain stationary. Also, the relative advancement of the film is desirably in countercurrent relation to the flow of moist air which is passed over the film. As the film advances, the solvent from the film vaporizes into the circulating air, while moisture from the air is at the same time absorbed into the film. By the time the film leaves the gelation zone, the film has been converted to a coherent polymerized structure having uniformly distributed minute filtering pores.

The specified countercurrent movement of the film and air has proven extremely desirable for assuring the maintenance of optimum conditions during gelation of the film. By virtue of this countercurrent arrangement, the moist air stream, as it is directed into contact with the film, first passes over that portion of the film which is about to leave the gelation zone. Subsequently, the same air advances into contact with portions of the film which have been in the zone a shorter period of time, ultimately to contact the film which is first entering the zone. The solvent progressively evaporates into the air, as the film advances, and moisture from the air progressively enters the film.

The relative humidity, temperature, and other conditions of the air are of course most accurately controllable at the point of introduction of the air into the gelation zone. The described counterflow arrangement allows this accurately controllable portion of the air stream to contact the film just before the film leaves the zone, so that the final part of the treating process in the zone is very accurately controlled, with resultant accurate control over the product structure. Also, this incoming air, which contacts the film just before it leaves the gelation zone, is free of solvent and rich in moisture, so that the final contact with the film in the gelation zone attains a maximum removal of solvent from the film, and adds a maximum of moisture to the film. As the air moves toward the film inlet location, the air progressively acquires more and more solvent and progressively loses its moisture. However, as the air thus gains solvent and loses moisture, it contacts portions of the film which are also rich in solvent and poor in moisture, so that the air is effective along its entire course of flow to cause a substantial transfer of solvent and moisture in the desired directions between the air and film.

Following such contact with a moist atmosphere, the film may be heated to the lower portion of its thermoplastic range, to stabilize the film in its coherent but porous state, and to dispel any residual volatile components and moisture from the film. This heating may be effected by passing over the film a second flow of air, heated to a proper temperature, this air preferably being passed over the film in countercurrent relation in the same manner as the first air stream.

The above and other features and objects of the present invention will be better understood from the following detailed description of the tyical embodiments illustrated in the accompanying drawing in which:

Fig. 1 is a somewhat diagrammatic view, partially broken away, of film forming apparatus constructed in accordance with the present invention;

Fig. 2 is an enlarged partially sectional view of the air entrance end of one of the film treating conduits in Fig. 1 (the conduit seen toward the left of that figure);

Fig. 3 is a view similar to Fig. 2, but showing the air entrance end of the other film treating conduit of Fig. 1;

Fig. 4 is an enlarged fragmentary vertical section through the lower portion of the solution spreading unit of Fig. 1;

Fig. 5 is an enlarged fragmentary transverse section taken on line 5—5 of Fig. 1; and Figs. 6 and 7 are fragmentary views of two slightly variational forms of the invention.

Referring first to Figs. 1 to 4, the apparatus there shown is adapted to form microporous films on a series of glass plates or other similar vapor impermeable carrier members 10, which are progressively advanced from the right to the left as seen in Fig. 1, and along the upper surfaces of two conveyor belts 11 and 12. As the glass plates 10 advance to the left, a film forming solution is first applied to the upper surface of the plates by a unit 13, following which the plates are advanced first through a conduit 14 in which the solution is converted to a coherent porous film, following which the film is passed through a second conduit 15 for heating to a temperature stabilizing the film and expelling any remaining volatile constitutents.

The solution spreading unit 13 includes a downwardly tapering feeding chamber 16 into which the film forming solution is fed through an inlet 17, to pass downwardly through the feeder and be progressively fed from its lower open end 18 onto the upper surfaces of the glass plates 10 which pass beneath unit 13. As a glass plate 10 advances to the left as seen in Figs. 1 and 4, the solution 19 applied to its upper surface from the hopper 16 is forced to pass beneath the lower downwardly directed edge of a vertical knife 20, which thus acts to determine the thickness of the film. Knife edge 20 may of course be vertically adjustable in any conventional manner to vary the film thickness. At the opposite side of hopper 16, there may be provided a plate-like member 24 which is pivoted to the hopper at 25 and is adjustable by a screw 26 to open and close the bottom opening of the hopper.

The film forming solution 20 in hopper 16 includes, and preferably consists entirely of, a solution or one or more cellulose esters in suitable solvents and/or diluents. The particular cellulose esters employed are usually cellulose acetate or cellulose nitrate, and preferably a combination of these two esters. These esters are dissolved in any of the known suitable primary solvents, such as formic or glacial acetic acid, esters, ketones and acetone, and any of the known suitable diluents or secondary solvents, such as ethers and alcohols or suitable mixtures thereof.

A combination of various different solvents and diluents is usually employed. Beyond this general description of the type of solution being employed, I will not go into detail as to the composition of the solution, since the novelty of the present invention does not reside in the chemical composition of the solution, but rather is directed to an improved way of physically treating the solution to arrive at a very accurately controlled and uniform porosity in the ultimate film. The various types of cellulose ester solutions which may be employed are well known in the art, and have been described in prior patents. In this connection, reference is made to the following patents and publications for further details in connection with possible specific solutions which may be employed: U.S. Patent No. 1,421,341, issued to Zsigmondy et al., June 27, 1922, on "Filter and Method of Producing Same"; German Patent 805,039, dated May 7, 1951; W. J. Elford, Proceedings Royal Society London, section B, 1930, vol. 106, page 216; and P. Grabar-L'Ultrafiltration Fractionee, Paris, 1943.

Conveyor 11 is an endless belt, which passes about a series of rollers 27, and is driven by an electric motor 28 whose speed may be varied by a control unit typically represented at 29. Conveyor 12 is a second belt very similar to belt 11, and is mounted for endless movement by a series of rollers 30. Belt 12 is driven by an electric motor 31 whose speed may be varied by control unit 32. The upper runs of belts 11 and 12 may extend directly horizontally and in mutual alinement, so that glass plates 10 may advance to the left along the upper run of belt 11, and then proceed to the left beyond that point along the upper run of belt 12. Belt 11, when operating, preferably runs at a considerably greater speed than belt 12, typically 50 to 100 times fast as belt 12, belt 11 preferably being driven at a speed between about 5 and 20 centimeters per second. In order to compensate for the difference in speeds of the two belts, belt 11 may be stopped during a part of the time that belt 12 is operating. The invention is not restricted to two different belt speeds; in fact one single belt extending over the whole length of the machine may be used if a continuous process is desired. In this case, the channel has to be long enough to permit a sojourn of the film sufficient for a complete reaction at the relatively high speed required by the casting procedure.

Immediately beyond the knife edge 20 of the feeder 13, the glass plate 10 and the carried film 33 passes into a substantially closed chamber 34 formed by walls including upper wall 22, which chamber contains air saturated with vapor of the solvent or solvents and diluents which are utilized in solution 19. Thus, while the films are in this chamber 34, substantially none of the solvent or diluent in the films is permitted to evaporate. After a glass plate and carried film have been advanced into chamber 34, they may remain stationary in that chamber (belt 11 having been stopped) until the relatively slow moving belt 12 is in a condition to accept the plate for passage through conduits 14 and 15.

When a plate commerces to move to the left along the upper surface of belt 12, the plate is first advanced through a horizontally extending conduit 14, within which a flow of moist air moves from left to right as seen in Fig. 1, that is, countercurrently or in a reverse direction with respect to the advancing plate 10 or belt 12. Conduit 14 forms a horizontally extending passage of rectangular cross section, having a horizontal top wall 36 (see Fig. 5), two spaced downwardly projecting parallel side walls 37, and a bottom wall 137. As the films 33 on the upper surface of plates 10 move through conduit 14 along the upper surface of belt 12, the films are in direct contact with the moist air which flows horizontally from left to right through conduit 14, so that the contact of the air with the films may have the effect of converting the films to the desired coherent or polymerized form. Preferably, the length of the air-film inner contacting area within conduit 14 is as great as the combined length of a plurality of the glass plates 10, desirably at least about two of the glass plates, the length of this air-film contact area typically being about 10 to 11 feet, and the length of the individual glass plates typically being about three feet to five feet. Those of the belt supporting rollers 30 that are positioned within conduit 14 may be mounted by shafts extendnig through side walls 37 of the conduit (see Fig. 5).

Air is fed to the forward end of conduit 14 by a blower 38 driven by an electric motor 29, whose speed may be varied by a control typically represented at 40. Blower 38 takes suction through an air filtering or cleaning unit represented at 41, and discharges first through a heater 42, and then through two parallel connected conduits 43 and 44. One of these conduits or branches (branch 44) contains a humidifier 45, which is adapted to add moisture to the air passing through branch 44, and preferably completly saturates that air with moisture, following which the humidified air from branch 44 is mixed with the unhumidified air from branch 43 to pass through conduit 46 into the forward end of the previously discussed conduit 14. The relative proportions of the air passing through branch 43 and 44 may be varied by adjustment of a swinging damper or valve member 47, which is adapted to completely or partially close off either of the branches 43 or 44, so that adjustment of valve 47 will accurately regulate the relative humidity of the air entering the left end of conduit 14.

The relative humidity of the air at the entrance end of conduit 14 is indicated by a hygrometer 48, and the temperature of the air at that point may be indicated by a thermometer 49. The rate of air flow through conduit 14 is indicated by a suitable flow meter, typically represented as a Pitot tube 50. The temperature, the humidity, and the air flow can thus be accurately controlled and reproduced. Their magnitude depends to a large extent upon the type of MF to be produced and may vary within wide limits. For instance, the relative humidity may be between about 50 and 90 percent, the temperature between about 60 and 110° F., and the air flow between about .1 and 5 feet per second. Valve 47, heater 42, and blower motor 39 are adjusted to maintain the desired humidity, temperature, and rate of air flow.

After the air has passed horizontally through conduit 14 to its right end, the air flows through a conduit 51 to a unit 52 which acts to remove the solvent from the air, following which the air is permitted to discharge into the atmosphere. Conduits 46 and 51 may of course be connected to the opposite ends of conduit 14 in any suitable manner, as by forming the ends of walls 36 and 37 and two end members 139 and 54 in a manner forming closed curving end portions of conduit 14 opening upwardly into conduits 46 and 51. Beneath the belt 12 and at opposite ends of bottom wall 137, there may be provided a pair of end walls 53 and 138 for preventing the escape of any substantial amount of air at those locations. Thus, conduit 14, and the later to be discussed conduit 15, effectively confine the air flowing through the conduits and prevents substantial leakage of the air. As will be apparent, members 139 and 54 are of course spaced slightly above the film, and do not directly contact it.

Beyond conduit 14 in the direction of advancement of plates 10, the plates and carried films pass along the underside of a conduit 15. This conduit is constructed substantially the same as conduit 14, and therefore will not be described in detail. A flow of air is fed to the forward end of conduit 15 from a blower 55, which is driven by a motor 56 whose speed may be varied by a control represented at 57. The air taken in by blower 55 is filtered by a filter unit represented at 58, and is then passed through a heater 59 before entering the forward end of conduit 15 at 60. At this entrance end of conduit 15, the temperature of the air is indicated by a thermometer 61, so that heater 59 may be regulated to maintain a proper temperature at the thermometer location. Also, a Pitot tube 62 or other flow meter is provided at the air entrance end of conduit 15, so that motor 56 may be regulated to maintain a predetermined desired air flow velocity. As in the case of conduit 14, air flows horizontally within conduit 15 along the upper surfaces of the films, and in a direction the reverse of the direction of film advancement, to ultimately discharge from conduit 15 through an outlet 63. The temperature at thermometer 61 is preferably maintained at the lower end of the thermoplastic range of the particular cellulose esters used in the film, preferably between about 160° F. and 270° F. The rate of air flow through conduit 15 may be maintained between about 1 and 10 cubic feet per minute.

To describe now what occurs as the plates pass through conduits 14 and 15, the passage through the first of these conduits serves to convert the film from a viscous fluid layer into a coherent membrane of microporous structure. As the air enters the forward end (left end) of conduit 14, the air has a high relative humidity, say about 80–90 percent, and contains virtually no solvent vapors. As the air progresses to the right within conduit 14 and along the upper surface of the films, the solvent in the films progressively vaporizes into the air and the moisture of the air is absorbed into the film to act as a precipitant in converting the films to their ultimate coherent or integrated form. When the air leaves conduit 14, the relative humidity of the air is low, and the air may be substantially saturated with the vapors of the solvents and diluents employed in the film forming solution.

The relative movement between the films and conduits 14 results in the subjection of every portion of the film to exactly the same series of conditions during gelation. This identical history causes the films to have very precisely uniform and predeterminable pore sizes. Also, the countercurrent relation between the moving air and the advancing films allows the incoming air stream at the forward end of conduit 14 to contact the outgoing portions of the plates, so that the final temperature, humidity, and other conditions of the plates just before leaving conduit 14 may be very accurately controlled. In addition, the reverse movement principle allows the most humid and most solvent free portion of the air stream to contact the film last, so that a maximum amount of moisture will be absorbed into the film, and a maximum amount of solvent will be vaporized into the air stream. Toward the other end of conduit 14 (the right end), the film is sufficiently free of moisture and sufficiently replete with solvent to enable a substantial amount of moisture to enter the film and a substantial amount of solvent to vaporize even though the air is not still in its original very moist and solvent free condition. Thus, the counterflow arrangement results in optimum and most efficient moisture and solvent transfer between the air and film.

The relatively high temperature within conduit 15 raises the film to the lower portion of its thermoplastic range, without however limiting or chemically decomposing any of its components, to thus stabilize the film and evaporate any volatile constituents and moisture so that the film as it leaves conduit 15 is a very stable membrane whose uniform porosity will not be altered by the conditions ordinarily encountered by this type of filter in use. After the films have been discharged from the exit end of conduit 15, the films are of course removed from plates 10, and the glass plates may then be again passed through the apparatus for forming additional films. The films are kept in conduit 14 long enough to complete the gelation of the film and polymerize the solution, about 10 to 20 minutes; and are kept in conduit 15 long enough to drive away all residual volative components of low volatility and raise the film temperature to the beginning of the thermoplastic range, usually between about 150° and 220° F.

Fig. 6 represents fragmentarily a variational form of apparatus, which is utilized for applying a film of the above described type to a porous paper, cloth, or other permanent backing material. In using the apparatus of Fig. 6, a sheet of porous paper, cloth, or the like 64 (on a glass plate 10a), is first moistened by a liquid feeding apparatus 164 with a suitable aqueous solution compatible with the solvent and diluents utilized in the film forming solution, following which the paper or other base material is passed beneath a roller 65 pressed downwardly by a spring or springs 165 which acts to compress the porous base material, force some of the excessive liquids from it, and give it a smooth upper film receiving surface. The solution utilized for impregnating paper 64 may typically be a mixture of water, acetone, and/or methyl alcohol. The plate 10a carrying the paper is then advanced by belt 11a beneath solution feeder 13a, to form a thin film of the solution on the upper surface of the paper. Beyond feeder unit 13a, the apparatus and method of film treatment would be the same as that described in connection with Figs. 1 to 4. The ultimate product produced by the variational apparatus of Fig. 6 is a microporous film reinforced by and bonded to the paper or other backing material. This backing material must of course be itself porous to pass the fluids which will be filtered.

Fig. 7 represents diagrammatically and fragmentarily another form of the invention, which is identical with that of Figs. 1–5 except that the upper wall 36b of conduit 14b varies in distance from the film surface in the direction of the air flow, but is always parallel to the film in the direction normal to this flow. In this manner it is possible to vary the air speed, and therewith the reaction rate, over certain defined regions of the film surface—that is to say, to increase or decrease the rate of moisture availability to the film at certain gelation stages, depending upon whether the profile of the channel ceiling at this particular point has a small or a large distance from the film surface, since the air velocity relative to the film is controlled by the cross section of the channel 14b, i.e. by the distance between channel ceiling and the film.

Where the claims refer to "relative" advancement of the film through the gelation zone (conduit 14), or use similar terminology, it is not intended that the coverage be limited to an arrangement in which the film actually moves and the conduit 14 or its equivalent remains stationary, but instead it is specifically intended to also cover an arrangement in which the film might be caused to "relatively" advance through the gelation zone by moving the conduit 14 while the film remained stationary.

I claim:

1. The method of making a uniform microporous filter from a solution of cellulose ester in a water-miscible solvent therefor comprising the steps of forming a liquid layer of a cellulose ester-water miscible solvent solution on a moving surface; moving said surface with the liquid layer thereon through a gelation zone; contacting the layer in said gelation zone with a counterflow of air and water vapor to evaporate said solvent and absorb water vapor into said cellulose ester layer thereby precipitating said cellulose ester in the form of a gel and converting said gel into a microporous, uniform film on said surface; thereafter moving said surface with said microporous film thereon into a second zone, drying the film in said second zone by heating same with a current of dry, hot gas which is chemically inert to said film, to a temperature wherein said film becomes thermoplastic; and continuing the heating of said film until the microporous structure thereof is stabilized.

2. The method of claim 1 wherein the rate of said counterflow of air and water vapor is varied over defined regions of the length of the layer in said gelation zone to control the progress of gelation.

3. The method of claim 2 wherein the variation in said rate of counterflow is effected by varying the profile of the air channel through said gelation zone.

4. The method of claim 1 wherein said counterflow of air and water vapor comprises air having a relative humidity between about 50 and 90%, a temperature between about 60 and 110° F. and a flow rate between about 0.1 and 5 feet per second.

5. The method of claim 4 wherein the air in said second zone has a temperature between 150 and 270° F.

References Cited in the file of this patent

UNITED STATES PATENTS

| | | |
|---|---|---|
| 1,421,341 | Zsigmondy | June 27, 1922 |
| 2,232,012 | Rooney | Feb. 18, 1941 |
| 2,245,429 | Carver | June 10, 1941 |
| 2,282,009 | Talbot | May 5, 1942 |
| 2,383,047 | Dreyfus | Aug. 21, 1945 |